Figure 1:
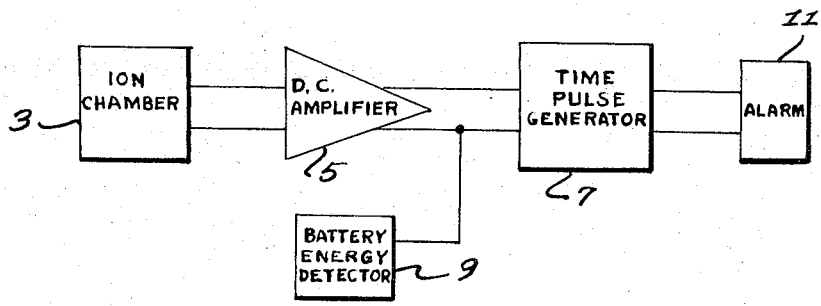

United States Patent [19]
Blackwell et al.

[11] 3,778,800
[45] Dec. 11, 1973

[54] SELF-MONITORING BATTERY OPERATED CIRCUIT

[75] Inventors: Lyman L. Blackwell; Paul A. Staby, both of Denver, Colo.

[73] Assignee: Statitrol Corporation, Lakewood, Colo.

[22] Filed: Apr. 9, 1971

[21] Appl. No.: 132,690

Related U.S. Application Data

[63] Continuation-in-part of Ser. No. 876,156, Dec. 4, 1969, Continuation of Ser. No. 546,663, May 2, 1966.

[52] U.S. Cl. ............... 340/249, 320/48, 340/237 S, 340/248 B
[51] Int. Cl. ........................................ G08b 19/00
[58] Field of Search ............ 340/249, 248 B, 384 E; 320/48

[56] References Cited
UNITED STATES PATENTS 2,988,708  6/1961  Schmidt .................. 340/384 E X
3,221,317  11/1965  Ferrigno ..................... 340/384 E X
3,226,705  12/1965  Kaufman et al. ............. 340/384 E X
3,517,382  6/1970  Stein et al. ................. 340/228 R X
3,349,386  10/1967  Zug ................................ 340/349
3,594,751  7/1971  Ogden et al. ................... 340/249 X
3,260,063  7/1966  Johnson ......................... 340/249 X

*Primary Examiner*—David L. Trafton
*Attorney*—Anderson, Spangler & Wymore

[57] ABSTRACT

Time pulse generator having biasing means therefor including a control device, which may be a transistor and means interconnecting the biasing means to the battery being monitored. The output of the time pulse generator is utilized to drive a signaling device to indicate a low level of battery energy and/or an alarm condition as detected by an external condition sensor.

9 Claims, 2 Drawing Figures

LYMAN L. BLACKWELL
PAUL A. STABY
INVENTORS

Anderson, Spangler & Wymore
ATTORNEY 3,778,800

SELF-MONITORING BATTERY OPERATED CIRCUIT

This application is a continuation in part of U.S. Pat. Ser. No. 876,156, filed Dec. 4, 1969, which is a streamlined continuation of U.S. Pat. Ser. No. 546,663 filed May 2, 1966, for "Circuit for Detection of Small Changes in Conductors of High Resistance."

The present invention relates to battery operated electronic devices having means for sensing and indicating low levels of battery energy.

Development of the solid state electronic art has advanced to the point where amplifying and control devices can be made to draw extremely small current when fully turned on, and when turned off they draw such a very low current that for all practical purposes they can be said to draw zero current. These properties are largely responsible for the increased use of battery operated solid state circuits because battery life can now be extended to such a degree that even circuits calling for a high degree of reliability can be utilized for battery operation. This later type of circuit would include, among others, those designed for monitoring and detection functions, where quiescent power consumption can be made extremely small and where higher power drain circuit performance, while very critical from a reliability standpoint, is nevertheless a fairly infrequent occurrence.

Although battery life can be made to extend for periods of several years, for low power consumptive circuits, it is nonetheless desirable to have available a sure and effective means for determining battery energy level so that batteries may be replaced before there is any danger that the circuit will fail to operate because of power failure. It is desirable to have supervision of a parameter to be detected, such as smoke, fire and the like, as well as the power supply for a period of at least one year without attention or maintenance. During this period there should be provided a total of at least 25 novelty alarms of a duration of at least 2 minutes each. In addition, there should be provided an extended trouble or battery monitor signal of at least 200 hours duration plus 5 minutes of continuous alarm available during the trouble period.

Prior art devices have used a supervisory battery as a reference to monitor the condition of a battery used for power, however, if the supervisory battery were to fail, no provision is made for registering an alarm condition or for monoitoring of the main battery which is an obvious deficiency.

It is thus the primary objective of this invention to provide a battery energy monoitoring circuit which drives its own power from the same source as that being monitored and overcomes the deficiencies of the prior art devices.

A second object of the invention is to provide a battery energy level monitor which will produce its own alarm when the energy in the battery being supervised is reduced to some predetermined level.

A further object of the invention is to provide a battery operated low power consumptive detector and alarm device which comprises a battery energy level monitor utilizing the same alarm means as that for indicating a true alarm.

A still further and general object of the invention is to improve the reliability of battery powered circuits.

Other objects, features and advantages of the invention will become apparent upon a reading of the following detailed description of a preferred form of the invention as it appears in combination with a circuit for detecting fire or products of combustion.

FIG. 1 is a block diagram of the invention in combination with a products of combustion detector.

Figure 2:
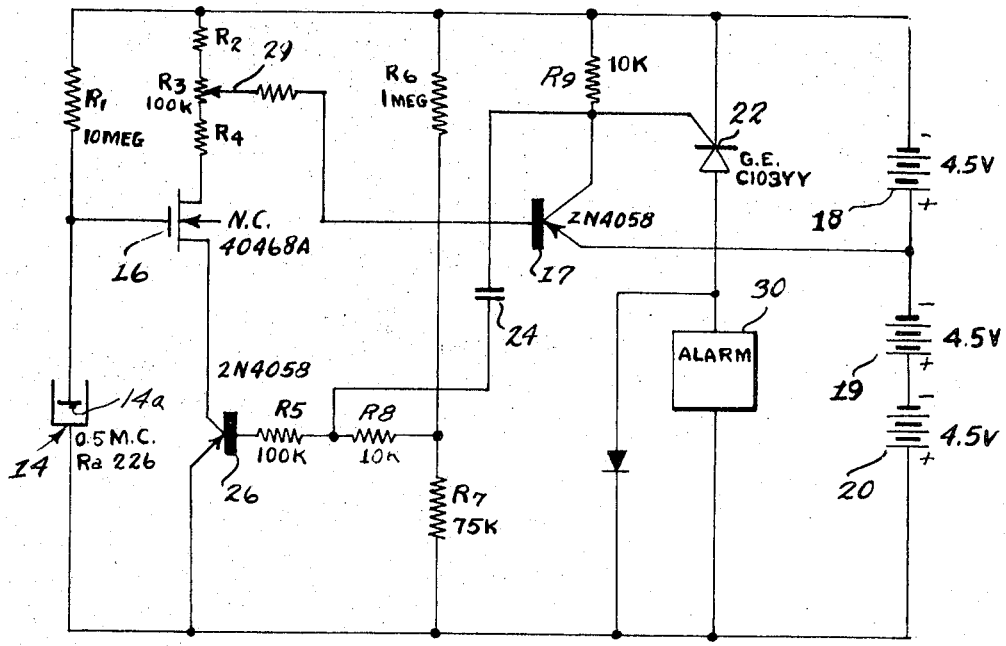

FIG. 2 is a schematic diagram of a preferred form of the circuit of the invention in combination with a typical fire detector unit, similar in operation and construction to those fire and products of combustion detectors disclosed in copending U.S. Pat. application Ser. No. 876,156, filed Dec. 4, 1969, which is a continuation of U.S. Pat. Ser. No. 546,663, filed May 2, 1966 and of which this application is a continuation-in-part.

The preferred form of the invention includes generally a transducer 3, a DC amplifier 5, a time pulse generating circuit 7, the battery energy level monitor 9, and the alarm means 11, as shown combined in the block diagram of FIG. 1.

In order to provide for longevity of battery operated systems upon the indication of an alarm condition, it is desirable that the alarm means be powered intermittently as opposed to a continuous time operation of the horn, light or whatever other means is employed to call attention to the alarm condition. Likewise, the means for indicating low battery energy must itself conserve power and yet be able to provide a battery level alarm signal for a period of at least 24 hours. This latter power requirement also indicates the advisability of a pulsed alarm system.

Having the foregoing power limitations in mind, it will be noted at the outset that the operation of the detector and battery monitor is so arranged that the pulse time generating circuit 7 produces no pulse train output when the input to the DC amplifier 5 is zero. Generation of an input signal to the amplifier 5 will result in a pulse train output which excites the alarm means in conformance with pulse spacing. As the input signal increases in magnitude, the pulse spacing decreases and the alarm indication becomes more intense. If desired, the pulse time generating circuit 7 can be made to eliminate all spacing between pulses, and thus produce a continuous output voltage for short periods of time when the condition being detected is most severe, as is the instance of a smoke detection circuit where the smoke density becomes high.

Output from the battery energy monitor circuit will also result in the generation of a pulse train from the time pulse generating circuit 7; however, the pulse spacing is preferably made relatively long so as to achieve the object of power conservation during a battery condition alarm.

An embodiment of the FIG. 1 concept is shown in FIG. 2 where the transducer takes the form of an ion chamber 14 of the type having two spaced electrodes defining a gas containing space therebetween and also including a radioactive radiation source 14a. The ion chamber and its characteristics are more elaborately treated in the disclosures of said prior U.S. Pat. applications, Ser. Nos. 546,663 and 876,156, and will therefore not be described in further detail here.

An insulated gate field effect transistor 16, an amplifier transistor 17, and an SCR amplifier switch 22, together with their related source of power and biasing circuits, comprise the DC amplifier portion of the system. The power source is found in batteries 18, 19 and 20 which are connected in series in a manner well known to the art in order to provide proper division of voltage for the various elements of the circuit.

The time pulse generating circuit 7 includes a pulse feedback capacitor 24 with appropriate interconnections between the DC amplifier (at the collector of transistor 17) and the battery monitoring device, shown as transistor 26, as will more fully appear subsequently.

In clear air operation, the ion chamber 14 draws sufficient current through the high resistance $R_1$ that the field effect transistor 16 is held on. As smoke or other products of combustion enter the open ion chamber 14, the resistance of the chamber increases, causing the field effect transistor 16 to turn off. Series connected resistors $R_2$, $R_3$ and $R_4$ are of such values as to provide proper voltage at the wiper 29 of $R_3$ to turn on the first amplifier transistor 17 at such time as the field effect transistor 16 starts to turn off. As transistor 17 turns on from its normal off state, a voltage arises on the collector of the transistor which point is connected to the gate of the SCR amplifier switch 22. Application of this voltage turns the SCR on and the current conducted therethrough also flows through and activates an alarm horn 30 which is connected in series with the SCR 22. The SCR 22 and horn 30 are connected across the batteries 18, 19 and 20 which provide power for their operation.

When the SCR switch 22 turns on, the pulse feedback capacitor 24 is discharged, and provides a signal to the base of the transistor 26 through a resistor $R_5$, turning off the transistor 26 and the interrupting the path to the drain of the field effect transistor 16. With this interruption, the field effect transistor 16 turns further off, thus turning on transistor 17, the SCR 22 and the horn 30. When capacitor 24 is fully discharged, transistor 26 turns on, turning FET 16 on, turning transistor 17 off. When the transistor 17 is turned off, the capacitor 24 charges, restoring the voltage to the base of transistor 26 and, if smoke is still present in the ion chamber, the process repeats itself, resulting in intermittent operation of the horn 30.

Without the previously discussed regard for power consumption during alarm, it is possible to arrange the bias voltages and other parameters of the circuit so that a high smoke density in the ion chamber will turn off the transistor 16 to such an extent that the feedback signal, from the capacitor 24, has no further effect since the transistor 16 is already turned off and the horn will sound continuously.

The transistor 26, previously referred to in connection with the pulse feedback circuit, acts also as the fundamental part of the battery energy detector. With fully charged batteries, there exists a voltage of approximately one-half volt on the base of transistor 26, this voltage appearing at the juncture of $R_6$ and $R_7$, a voltage divider cnnected across the batteries being monitored. The one-half volt maintains transistor 26 in an on state and provides a path from the drain source of the field effect transistor 16 so that it may function.

As such time as the energy of batteries 18, 19 and 20 is reduced to the point where the voltage divider comprising $R_6$ and $R_7$ supplies approximately .4 volts or less to the base of transistor 26, transistor 26 starts to turn off, impeding the drain source path of transistor 16. As transistor 26 turns off, the gate-to-source voltage in transistor 16 increases, tending to turn transistor 16 off in the same fashion as with smoke particles in the ion chamber. Also in the same manner as with a true alarm, the horn 30 is turned on briefly and then turned off through the feedback action of the capacitor 24. It should be noted that low battery voltage turns the transistor 26 only partially off while a feedback pulse through the capacitor 24 will turn it off definitively. Thus, it will be noted that the alarm signal and the monitor signal are quite distinctive, one from the other. The alarm signal provides rapid intermittent occurring signals with a minimum of time between signals increasing to a continuous signal as the severity of the alarm condition increases. The monitor alarm signal, on the other hand, occurs for only short intervals with relatively long periods between signals, however, it is noted that an alarm signal will override the monitor signal and will take precedence thereover if an alarm condition develops even after the monitor signal has been activated.

The practical result of the battery detection circuit is to produce very short monitor alarm sounds at widely spaced intervals as the battery starts to lose significant energy, but as more energy is lost and as the battery voltage drop continues, the monitor alarm becomes more frequent or in other words, the periods between monitor alarm signals becomes shorter.

What is claimed is:

1. Battery operated electronic detection apparatus, comprising:

a set of electrical terminals for connection to the terminals of a battery power source;

battery powered means for sensing a selected condition and generating a first electrical signal representative of said condition, said sensing means being connected to receive power from said electrical terminals whereby to be powered by a battery power source connected thereto, said sensing means also being responsive to the output voltage of the battery power source connected to said electrical terminals to generate a second electrical signal whenever said output voltage falls below a predetermined level; and, battery powered alarm means connected to receive power from said electrical terminals whereby to be also powered by the battery power source connected thereto, said alarm means being connected to said sensing means to be driven by either said first or second electrical signal and being operable to generate an alarm signal corresponding to the electrical signal by which it is driven.

2. The invention defined in claim 1 wherein:

said selected condition sensed by said sensing means is the clarity of air; and, said sensing means includes ion chamber means for sensing air clarity, said ion chamber means being operable to control current flow therethrough as a function of the clarity of the air being monitored therein.

3. The invention defined in claim 2, wherein said sensing means includes a field effect transistor, said sensing means being operable to generate said first and second electrical signals by controlling the current flow through the drain-source current path of said field effect transistor as a function of, respectively, the intensity of said selected condition being sensed and the level of the output voltage of the battery power source connected to said electrical terminals.

4. The invention defined in claim 3, wherein said sensing means includes:

sensor means for sensing said selected condition and generating an electrical control signal corresponding thereto, the gate electrode of said field effect transistor being connected to receive said control signal whereby the electrical resistance of the drain-source current path of said field effect transistor varies as a function of the magnitude of said control signal; and, a first transistor having its emitter-collector current path connected as a current control device in series with said drain-source current path, the base electrode of said first transistor being connected to monitor the output voltage of the battery power source connected to said electrical terminals whereby to control the current flow through said series connected emitter-collector and drain-source current paths as a function of the level of said output voltage.

5. The invention defined in claim 4, wherein:
said alarm means includes a horn connected in series with the anode-cathode current path of a silicon controlled rectifier; and including:
resistor means having a voltage pickoff connected in series with the drain-source current path of said field effect transistor whereby to generate a voltage signal on said voltage pickoff proportional to the current flow through said drain-source current path; and,
a second transistor connected as an amplifier between said voltage pickoff and the gate electrode of said silicon controlled rectifier said second transistor being operable to generate and apply said first and second electrical signals to said control electrode by amplifying the voltage signal appearing on said voltage pickoff.

6. The invention defined in claim 5, including a capacitor connected between the control electrode of said silicon controlled rectifier and the base electrode of said first transistor, said capacitor being discharged through said silicon controlled rectifier whenever the anode-cathode current path of said silicon controlled rectifier is triggered into conduction by the generation of either said first or second electrical signal on said control electrode, the discharge of said capacitor being operable to apply a feedback pulse to the base electrode of said first transistor which biases the emitter-collector current path of said first transistor into a substantially nonconductive state.

7. The invention defined in claim 1, wherein said first and second electrical signals generated by said sensing means are distinctly different so that the alarm signal generated by said alarm means in response to said first electrical signal is noticeably different from the alarm signal generated in response to said second electrical signal.

8. The invention defined in claim 7, wherein:
said first electrical signal is a first pulse train having a pulse spacing inversely proportional to the intensity of said selected condition being sensed; and,
said second electrical signal is a second pulse train having a pulse spacing noticeably greater than the pulse spacing of said first pulse train and a pulse width noticeably shorter than the pulse width of said first pulse.

9. Battery powered electronic detection apparatus, comprising:
a set of electrical terminals for connection to the terminals of a battery power source;
battery powered first means for sensing a selected condition and generating a first electrical signal representative of said condition, said first means being connected to receiver power from said electrical terminals whereby to be powered by a battery power source connected thereto;
battery powered second means responsive to the output voltage of the battery power source connected to said electrical terminals for generating a second electrical signal whenever said output voltage falls below a predetermined level, said second means being connected to receive power from said electrical terminals whereby to be also powered by the battery power source connected thereto; and,
battery powered alarm means connected to receive power from said electrical terminals whereby to be powered by the battery power source connected thereto, said alarm means being connected to said first and second means to be driven by either said first or second electrical signal and being operable to generate an alarm signal corresponding to the electrical signal by which it is driven.

* * * * *